(12) United States Patent
Sovago et al.

(10) Patent No.: US 11,505,171 B2
(45) Date of Patent: Nov. 22, 2022

(54) NOISE DAMPER FOR COMPRESSED AIR SYSTEMS AND A METHOD FOR THE PRODUCTION OF SAME

(71) Applicant: KNORR-BREMSE SYSTEME FUER NUTZFAHRZEUGE GMBH, Munich (DE)

(72) Inventors: Szabolcs Sovago, Kecskemét (HU); Miklos Tanczos, Kecskemét (HU); Marton Fekete, Budapest (HU); Daniel Bujdoso, Izsák (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 370 days.

(21) Appl. No.: 16/648,786

(22) PCT Filed: Sep. 18, 2018

(86) PCT No.: PCT/EP2018/075138
§ 371 (c)(1),
(2) Date: Mar. 19, 2020

(87) PCT Pub. No.: WO2019/063350
PCT Pub. Date: Apr. 4, 2019

(65) Prior Publication Data
US 2020/0269827 A1   Aug. 27, 2020

(30) Foreign Application Priority Data
Sep. 26, 2017   (DE) .................... 10 2017 122 215.4

(51) Int. Cl.
*B60T 17/00*   (2006.01)
*G10K 11/16*   (2006.01)
*B60T 15/36*   (2006.01)

(52) U.S. Cl.
CPC .......... *B60T 17/008* (2013.01); *G10K 11/161* (2013.01); *B60T 15/36* (2013.01)

(58) Field of Classification Search
CPC ..... B60T 17/008; B60T 15/36; G10K 11/161; F15B 21/008
(Continued)

(56) References Cited

U.S. PATENT DOCUMENTS

| 4,424,883 A | 1/1984 | Musiani |
| 6,748,305 B1 | 6/2004 | Klausner et al. |

(Continued)

FOREIGN PATENT DOCUMENTS

| CN | 103738338 A | 4/2014 |
| CZ | 279571 B6 | 5/1995 |

(Continued)

OTHER PUBLICATIONS

International Search Report dated Jan. 4, 2019 of the corresponding International Application PCT/EP2018/075138.

*Primary Examiner* — Jeremy A Luks
(74) *Attorney, Agent, or Firm* — Norton Rose Fulbright US LLP; Gerard Messina (57) ABSTRACT

A noise damper for a compressed-air system, for a brake system of a utility vehicle, including: a housing having an inlet channel for a compressed-air stream and with a chamber for accommodating sound-damping material, in which the inlet channel and the chamber are separated, perpendicularly with respect to the compressed-air stream, by a separating plate which is closed in a central region and which, in an outer peripheral region of the compressed-air stream, has multiple openings for introducing the compressed air directly into the chamber. Also described are a related pneumatic brake system and method.

15 Claims, 5 Drawing Sheets

(58) Field of Classification Search
USPC .......................................................... 181/230
See application file for complete search history.

(56) References Cited

U.S. PATENT DOCUMENTS

| | | | | |
|---|---|---|---|---|
| 2004/0231913 | A1* | 11/2004 | McCombs | F01N 1/24 |
| | | | | 181/258 |
| 2008/0289900 | A1* | 11/2008 | Christoffers | B60T 17/008 |
| | | | | 181/258 |
| 2011/0202227 | A1 | 8/2011 | Zhang et al. | |
| 2014/0365178 | A1 | 12/2014 | Schramm et al. | |

FOREIGN PATENT DOCUMENTS

| | | | | |
|---|---|---|---|---|
| DE | 2910209 | A1 | 9/1980 | |
| DE | 3110774 | A1 | 10/1982 | |
| DE | 4040278 | A1 | 6/1992 | |
| DE | 4237630 | A1 | 5/1994 | |
| DE | 19609222 | A1 * | 9/1997 | .............. B60T 13/24 |
| DE | 19701361 | C1 | 5/1998 | |
| DE | 19903286 | A1 * | 8/2000 | ............ B60T 15/027 |
| DE | 10014994 | A1 | 10/2000 | |
| DE | 10222187 | A1 | 12/2003 | |
| DE | 102010049909 | A1 | 5/2012 | |
| DE | 102013013281 | A1 | 2/2015 | |
| DE | 102015111515 | A1 | 1/2017 | |
| EP | 0019855 | A1 | 12/1980 | |
| EP | 0093842 | A1 | 11/1983 | |
| EP | 0359945 | A2 | 3/1990 | |
| EP | 0379160 | A1 | 7/1990 | |
| EP | 0708007 | A1 | 4/1996 | |
| EP | 2266854 | A2 * | 12/2010 | .............. B60T 15/54 |
| WO | 2009152884 | A2 | 12/2009 | |
| WO | WO-2009152884 | A2 * | 12/2009 | ........... B60T 17/008 |
| WO | 2017009445 | A1 | 1/2017 | |

* cited by examiner

NOISE DAMPER FOR COMPRESSED AIR SYSTEMS AND A METHOD FOR THE PRODUCTION OF SAME

FIELD OF THE INVENTION

The present invention relates to a noise damper for compressed-air systems, to a compressed-air system, and to a method for producing noise dampers.

BACKGROUND INFORMATION

Compressed-air systems often release large quantities of compressed air into the surroundings within an extremely short time. This expansion process can produce considerable noises. In order to keep the noise emission at an admissible level, noise dampers are commonly required for compressed-air systems.

The housing of such noise dampers may be connected directly to a pneumatic valve, for example by a bayonet fastener. One known system is discussed for example in EP 0 708 007 B1, wherein the valve body has an outlet channel which is partially integrated in the inlet channel of the noise damper unit. A further possibility consists in providing a channel-like intermediate component which, for example as part of the housing of the noise damper, provides a connection to the outlet channel of a valve and fastens the noise damper unit to a pneumatic valve. For noise damping, the noise dampers suitable for compressed-air systems typically have a noise damping region which is filled with noise-reducing material and which is accommodated within a housing. Such a system is discussed in DE 197 01 361 C1.

In order to increase the performance of the noise damper, it is for example possible to enlarge the passage of the compressed air in the noise-reducing material. For this purpose, it is for example possible to utilize a larger housing for the noise-reducing material. This is however often difficult to implement, because there is often not sufficient space available. In the case of utility vehicles, the available space is increasingly limited, and it is scarcely possible to accommodate larger noise dampers. It is likewise possible to realize a longer flow path for the compressed air in the noise-reducing material by virtue of the compressed-air stream being deflected and diverted multiple times through the noise-reducing material. Such a system is discussed for example in WO 2009/152884 A3. Said system however has the disadvantage that it has a relatively high flow resistance for the compressed air. The changes in direction can furthermore lead to blockages or instances of icing occurring within the noise-reducing material. Specifically, in general, the compressed air has contaminants and/or a high moisture content, such that the sudden pressure drop leads to considerable cooling, and the contaminants or the moisture can easily precipitate, or leads to instances of clumping, at various locations.

In the case of a further noise damper (for example in DE 4 040 278 A1), the compressed air initially flows into a free space of large volume, which is connected to a region in which the noise-reducing material is situated. For this purpose, a perforated plate is provided between the two regions, which perforated plate introduces the compressed-air flow into the noise-reducing material. However, in this noise damper, too, the compressed-air stream is diverted multiple times, which is not optimal and can lead to the above-stated instances of clumping/deposition.

In DE 10 2013 013 281 A1, the compressed-air flow is, by a curved surface, deflected in a targeted manner between an inlet region and a region with the noise-reducing material, for which purpose a central opening and marginal passages are provided. Furthermore, above the noise-reducing material, an expansion region is provided which is connected to the marginal passages. It has however been found that this compressed-air guidance also does not realize an adequate noise reduction.

Since ever more stringent environmental regulations lead to ever greater demands with regard to the noise reduction for compressed-air systems, the known systems are no longer effective enough to attain the required large noise reduction and at the same time adequately rule out the risk of blockages and instances of icing or be accommodated in a space-saving manner.

There is therefore a demand for further systems which provide effective noise damping for compressed-air systems, in particular for brake systems.

SUMMARY OF THE INVENTION

The above-stated problems are at least partially achieved by a noise damper as described herein, a pneumatic brake pressure system as described herein, and a method for producing the noise damper as described herein. The dependent claims define further advantageous embodiments.

The present invention relates to a noise damper for compressed-air systems, in particular for brake systems of utility vehicles. The noise damper comprises a housing with an inlet channel for a compressed-air stream and with a chamber for accommodating sound-damping material. The inlet channel and the chamber are separated, perpendicularly with respect to the compressed-air stream, by a separating plate which is closed in a central region and which, in an outer peripheral region of the compressed-air stream or of the inlet channel, has multiple openings for introducing the compressed air directly into the chamber. The compressed air can, in particular after passing through the openings, be introduced directly into the optionally present sound-damping material, specifically without being redirected and without having to pass through intermediate chambers or air gaps.

The sound-damping material may, though need not imperatively, be present in the chamber. The invention is not intended to be restricted to a particular sound-damping material, as long as said material is suitable for damping the sound of the compressed-air stream or damping sound waves that pass through. For example, said sound-damping material may have a filiform material in a woven, crocheted or meshed structure, or else may have a granular structure, wherein the shape, size, strength, porosity etc. is selected so as to firstly pose little obstruction to the compressed-air stream but secondly dampen the sound in efficient manner, wherein the compressed-air stream runs from the inlet channel to exit openings in the housing.

Optionally, the multiple openings in the separating plate have a cross section which widens along the compressed-air stream into the chamber. The housing may furthermore have, at a level of the chamber, a shoulder region, such that the chamber has, along the compressed-air stream, a larger cross-sectional area than the inlet channel. The cross section of each individual opening thus widens in the air stream direction and may end in a distribution channel. The sound-damping material is thus optimally utilized. For example, the openings may be provided uniformly only in an outer peripheral region of the separating plate.

Optionally, the sound-damping material is in direct contact with the separating plate and is situated under preload in the chamber, such that the compressed-air stream, after passing through the openings, passes directly into the sound-damping material and, even during operation, an air gap between sound-damping material and the separating plate is prevented. The air gap may be any form of gap or space where no sound-damping material is present. In exemplary embodiments, no such gap is present anywhere in the chamber, not even during operation if considerable pressure fluctuations occur. To achieve this, it is optionally possible for the sound-damping material to be arranged, so as to be elastically compressed by up to 10%, in the chamber.

Optionally, the housing comprises, opposite the separating plate along the compressed-air stream, a base plate (exit plate or outlet plate) with a multiplicity of exit openings for the compressed-air stream, wherein the exit openings are formed in particular as a honeycomb pattern in the base plate. Here, the exemplary honeycomb structure offers very good mechanical stability together with a very good weight ratio. It is likewise possible for the housing to be formed such that no exit opening is closer to the openings in the separating plate than the distance between the separating plate and the base plate.

Optionally, the baseplate forms an indentation into the chamber. By such a concave form, viewed from a housing outer side (or convex form, if viewed from a housing inner side), a strength of the baseplate is increased. It is thus furthermore achieved that, during the assembly of the housing, the noise-reducing material is pushed in the direction of the inlet channel. The formation of a gap is thus prevented.

Optionally, the housing comprises a first housing part and a second housing part, wherein the first housing part and the second housing part have a connection arrangement (apparatus/device) for connecting the first housing part and the second housing part to one another in a fixed and sealed manner. The connection arrangement may for example comprise at least one of the following:
  a bayonet fastener;
  a detent connection;
  a groove-type connection;
  an adhesive connection.

The formation of a gap between the two housing parts may form an opening, specifically in the region where R<L and no outlet is desired.

These connections may also be combined. It is thus likewise possible for the two housing parts to be adhesively bonded to or sealed with one another within the groove in order to ensure an adequate seal.

The connection arrangement provides in particular a sealed connection between the first housing part and the second housing part in order to prevent an undesired escape of air between the first housing part and the second housing part. For this purpose, corresponding seals may be provided, or the contact surfaces are of a correspondingly planar configuration, such that the desired sealing action can be achieved by a suitable contact pressure.

Optionally, the noise damper comprises reinforcement elements which are formed at at least one of the following positions on the housing:
  connection region between the shoulder region and the inlet channel;
  annularly along an outer cylindrical periphery of the chamber;
  at the exit openings, wherein the reinforcement elements comprise in particular radial ribs and concentric ribs, between which the exit openings are formed.

Since the material of the housing is or may comprise a plastic, for example, these reinforcement elements increase the strength of the housing and thus considerably improve the noise damping (for example, vibrations are prevented).

Optionally, the exit openings and/or the reinforcement elements are formed on the base plate such that the compressed-air stream exits partially laterally in a radial direction (with respect to an axial axis of the noise damper) even if the axial outflow is prevented for any reason.

The present invention also relates to a pneumatic brake system of a utility vehicle or to the utility vehicle itself with a venting device (for example a venting valve), wherein the pneumatic brake system has a noise damper as described above, the compressed-air inlet of which is connected to the venting device. The noise damper may for example be connected by a screw connection or detent connection to an outlet (vent) of a valve.

The present invention also relates to a method for producing a noise damper for compressed-air systems, in particular for brake systems of utility vehicles. The method comprises forming a housing by the following steps:
  forming an inlet channel for a compressed-air stream;
  forming a chamber for accommodating sound-damping material;
  forming a separating plate which separates the inlet channel and the chamber perpendicularly with respect to the compressed-air stream; and
  forming multiple openings in an outer peripheral region of the compressed-air stream in order to introduce the compressed air into the chamber.

It is self-evident that the list of the method steps does not imply a particular sequence during the execution thereof. They may be executed in this sequence or in a different sequence. Furthermore, all features of the noise damper may be produced by further optional method steps. In particular, the method may comprise the introduction of the sound-damping material and a joining-together of the various housing parts.

Furthermore, the method may be executed such that the sound-damping material is situated under preload in the chamber.

Exemplary embodiments at least partially solve the above-stated problems by a noise damper if the chamber is filled with the noise-reducing material (sound-damping material) and a noise reduction is effected, wherein the compressed air is introduced via the openings in the periphery. At the same time, the flow directions in which the compressed-air stream propagates are optimized, and only tolerable small deformations of the exemplary plastics housing arise—even if large internal pressure changes occur during the venting of an exemplary pneumatic valve.

Furthermore, exemplary embodiments prevent the formation of a gap (or of a space) between the housing parts. In the case of conventional sound dampers, owing to the sudden pressure increase within the housing, such gaps arise, or are explicitly provided, both at upper and at lower housing portions. Said gaps make the noise reduction inefficient, because an additional compressed-air flow occurs. Since exemplary embodiments reliably prevent gaps, this effect also does not arise.

The exemplary embodiments of the present invention will become better understood from the following detailed description and the appended drawings of the various exemplary embodiments, which should however be understood not as restricting the disclosure to the specific embodiments, but rather as serving merely for explanation and for better understanding.

DETAILED DESCRIPTION

Figure 1A:
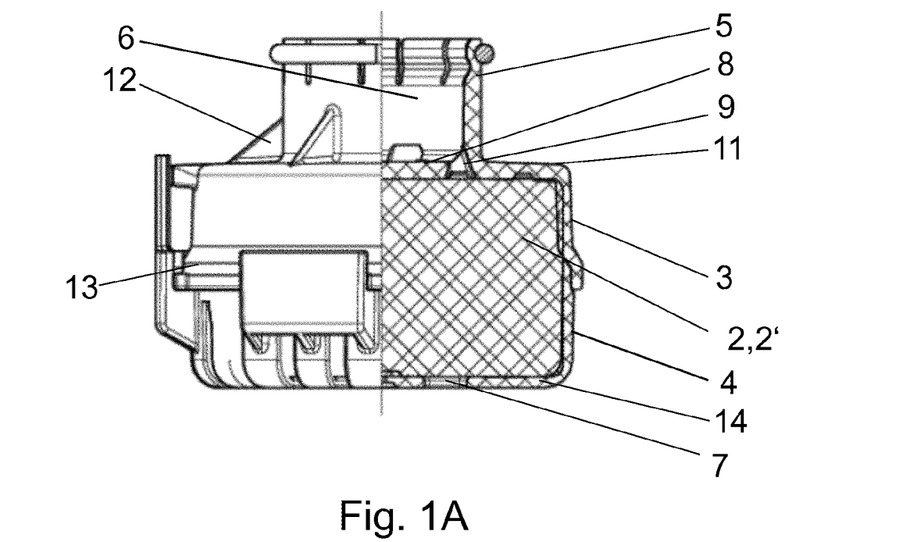
FIGS. 1A and 1B show a noise damper according to an exemplary embodiment of the present invention.

FIG. 1A shows an external view with a partial section through a noise damper according to an exemplary embodiment of the present invention. The noise damper is suitable for compressed-air systems, in particular for brake systems of utility vehicles, and comprises a housing 3, 4 with an inlet channel 6 for a compressed-air stream and comprises a chamber 2 for accommodating sound-damping material 2'. The inlet channel 6 and the chamber 2 are separated from one another, perpendicularly with respect to the compressed-air stream, by a separating plate 8 which, in an outer peripheral region of the compressed-air stream or of the inlet channel 6, has multiple openings 9 for introducing the compressed air into the chamber 2. In particular, the openings 9 may be formed in a regular manner only in the outer peripheral region, such that the separating plate 8 has no openings in its central region (for example in relation to the inlet channel 6).

The housing 3, 4 of the noise damper is divided into two parts or portions: an upper, first housing part 3 with a connection part 5, and a second, lower housing part 4. The connection part 5 comprises the inlet channel 6 and serves for the connection of the noise damper to an exemplary valve body or to some other source of compressed air that is to be dissipated in a quiet manner. Furthermore, the connection part 5 has a smaller cross-sectional area (perpendicular to the compressed-air stream) than the chamber 2. Therefore, the upper housing part 3 forms, at the transition to the connection part 5, a shoulder region 11, which is supported by reinforcement elements 12 with the connection part 5. The lower housing part 4 comprises a base plate 14 (outlet plate) with outlet openings 7 formed therein for the purposes of releasing the compressed air in a sound-dampened manner to surroundings.

The upper housing part 3 is connected together with the lower housing part 4 in order to form the chamber 2 with the optional sound-damping material 2'. The connection may be made approximately centrally. It is however likewise possible for the connection between the housing parts 3, 4 to be made at the shoulder region 11 or at the base plate, such that for example more than 90% of the volume of the chamber 2 is present in the upper or in the lower housing part 3, 4. The upper housing part 3 may be connected to the lower housing part 4 optionally by a detent connection or a bayonet connection.

Figure 1B:
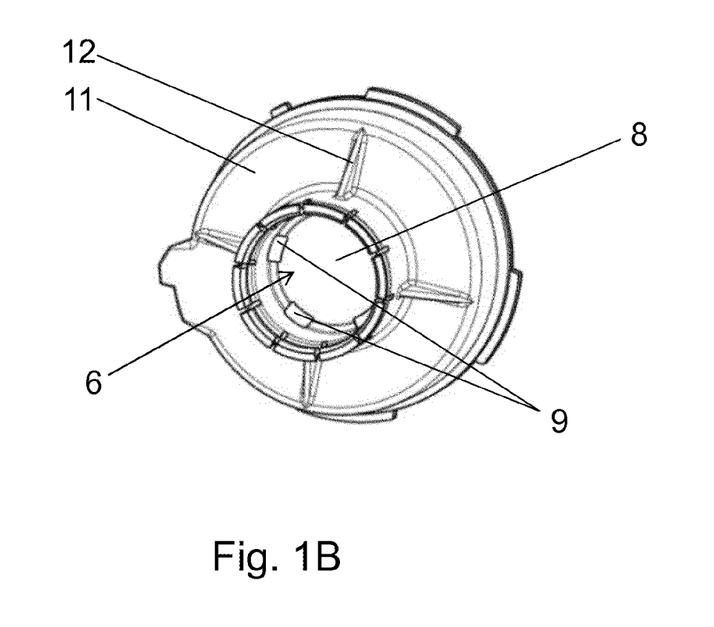

FIG. 1B shows a plan view into the inlet channel 6 of the noise damper. It can be seen in FIG. 1B how openings 9 are provided at regular intervals along the outer periphery of the separating plate 8 in order to conduct the compressed-air stream that flows in via the inlet channel 6 onward into the chamber 2 situated downstream of said inlet channel.

The housing parts 3, 4 are manufactured for example from a plastics material, because this, on the one hand, is inexpensive to produce, exhibits no corrosion and has a low weight. However, the plastics material is commonly easily deformable, which is often not desired, because it restricts the noise damping action. In particular in the case of sudden instances of venting of compressed-air systems, pressure waves can arise as a result of suddenly occurring air pressure fluctuations, which pressure waves can lead to vibrations or deformations of the housing 3, 4. In order to be able to suppress such deformations, reinforcement elements may be formed at various positions of the noise damper. Examples of these are the reinforcement elements 12 in the shoulder region 11, or ribs 13 which may be formed along the outer periphery of the housing 3, 4.

Figure 2:
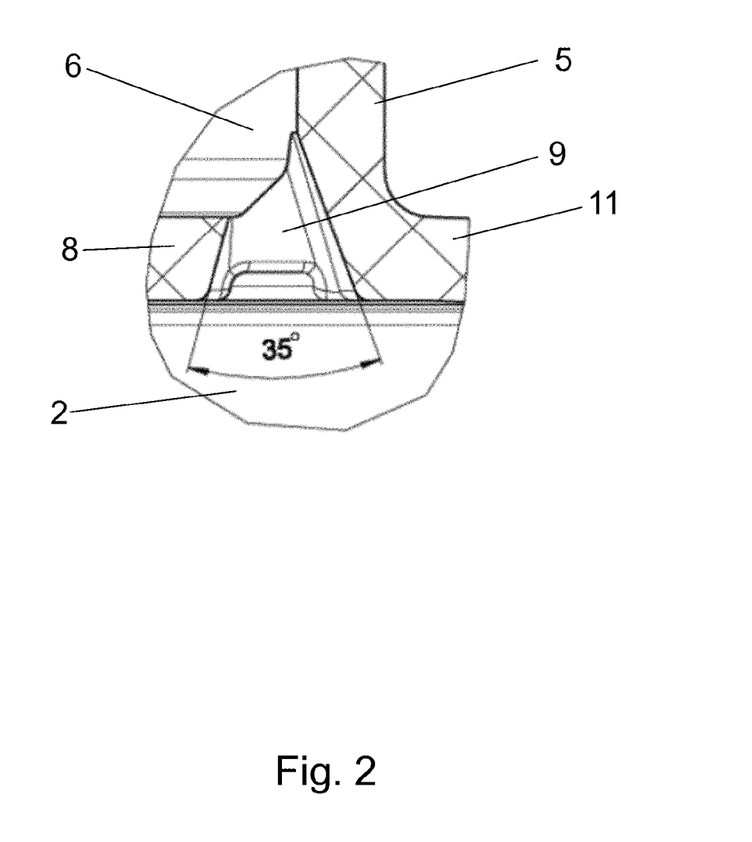
FIG. 2 shows an enlarged illustration of an opening according to a further exemplary embodiment.

FIG. 2 shows an enlarged illustration of an exemplary opening 9 which connects the inlet channel 6 to the chamber 2 situated therebelow. Said opening 9 is formed between the separating plate 8 and the shoulder region 11 at the location at which the connection part 5 transitions into the shoulder region 11, and thus in an outer edge region of the separating plate 8.

The opening 9 has, from top to bottom along the compressed-air stream, a widening cross section, wherein the opening angle amounts to, for example, 35°. In further exemplary embodiments, the opening angle may be configured to be correspondingly variable. It is thus achieved that the compressed-air stream from the inlet channel 6 can expand as widely as possible in the chamber 2, and thus leads to a rapid pressure dissipation. For example, the sum of the cross-sectional areas of all openings 9 is an area which amounts to no more than 25% of the cross section of the inlet channel 6. Furthermore, the openings 9 end for example as close as possible to the sound-damping material 2', in order to ensure that the compressed-air flow is introduced into, and forced through, the sound-damping material 2' in multiple directions.

Figure 3:
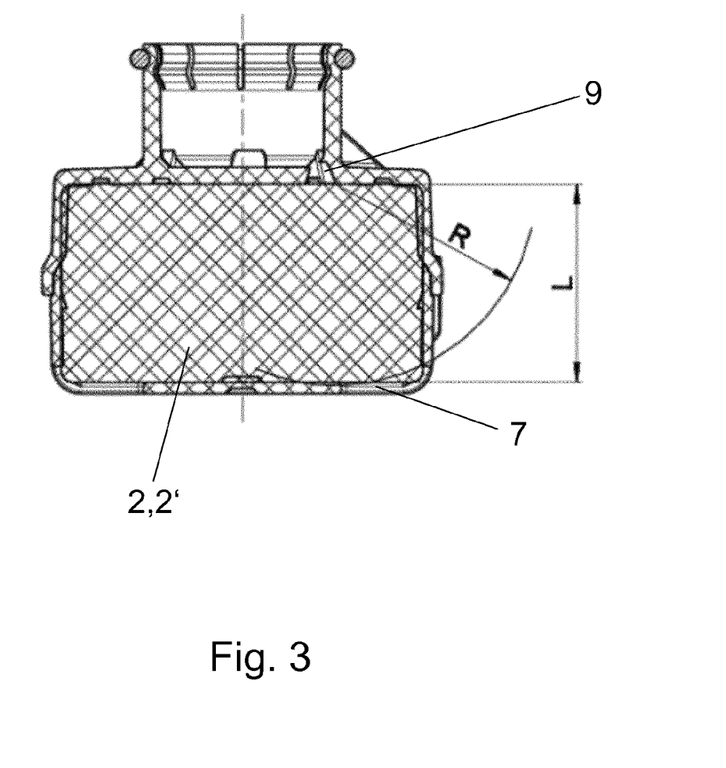
FIG. 3 shows a cross-sectional view through the noise damper.

FIG. 3 shows a cross-sectional view along the compressed-air flow through the noise damper, wherein the inlet channel 6 can be seen at the top, and the chamber 2, which is of wider form, is arranged therebelow with the sound-damping material 2'.

FIG. 3 likewise shows an opening 9 as has also been described in FIG. 2. The geometry of the housing is for example formed such that the shortest connection R between the opening 9 and the outlet opening 7 is greater than or equal to the height L of the chamber 2 along the compressed-air stream. This means that the following applies:

$$R \geq L$$

For this purpose, it is for example possible for the outlet openings 7 to be provided on the opposite side in relation to the inlet channel 6, but partially also at or on the adjacent region of the side wall. It is thus ensured that the compressed-air stream propagates in the chamber 2 with the sound-damping material 2' for as long as possible. This leads to an efficient sound reduction.

In order to further optimize the noise damping, it is advantageous if as far as possible no (air) gap forms between the upper portions of the housing (shoulder region 11 or separating plate 8) and of the sound-damping material 2'. This is ensured by exemplary embodiments. It is furthermore advantageous if, during operation, no gaps or spaces arise under the action of pressure during the venting. To achieve this, it is for example possible for the volume of the chamber 2 to be filled entirely, or at least filled by more than 95%, with sound-damping material 2'. It is likewise possible for the chamber 2 to be overfilled with sound-damping material 2'. For this purpose, in the uncompressed state, the volume of the sound-damping material 2' may be up to 10% greater than the volume of the chamber 2. When the housing parts 3, 4 are joined together, the sound-damping material 2' will then be under preload within the chamber 2. For this purpose, it is advantageous if the sound-damping material 2' has for example a certain elasticity, despite a possible limited elastic deformation of the housing in order to realize the preload.

The formation of an undesired gap may also be prevented by virtue of the housing 3, 4-despite preloading by the sound-damping material 2'—as far as possible not deforming under the influence of the compressed-air stream. To prevent this, stabilizing elements may be provided on the housing parts 3, 4. Furthermore, connections between the two housing parts 3, 4 may be formed in order to reduce the deformations and in particular the gap formation among the noise-damping material 2' and the housing parts 3 and 4 and between the housing parts 3, 4 during the action of the pressure loading. In principle, there are three regions which can be correspondingly stiffened:

1. The above-stated support ribs 12 (see FIG. 1A) can support the upper shoulder region 11 on the upper housing part 3 against the connection part 5, such that a gap between the shoulder region 11 and the noise-damping material 2' is prevented.
2. The upper and/or lower housing part 3, 4 may be of cylindrical form and stiffened with reinforcement elements in the form of ribs 13. The ribs 13 may for example be provided in the vicinity of the region in which the upper and the lower housing part 3, 4 are connected to one another. This prevents a gap from being able to form between the two housing parts.
3. As will be described below, it is likewise possible to provide reinforcement elements on the base plate 14 as part of the lower housing 4, in order to prevent axial movements of the noise-reducing material 2'.

Figure 4A:
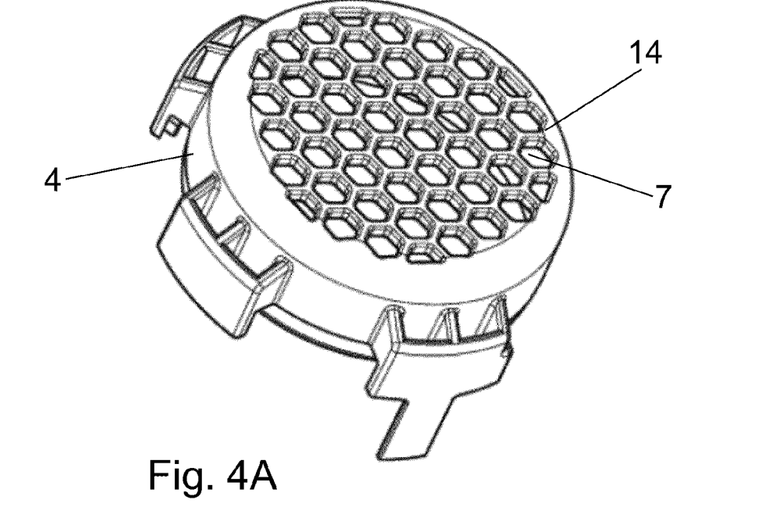
FIGS. 4A, 4B, and 4C show further views of a possible embodiment of the base plate with the exit openings according to further exemplary embodiments.
Figure 4B:
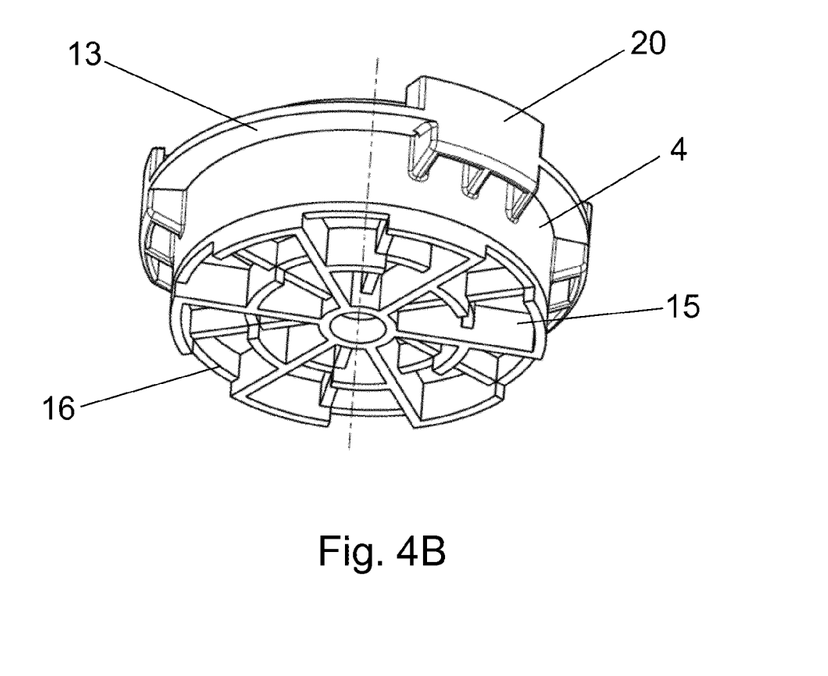
Figure 4C:
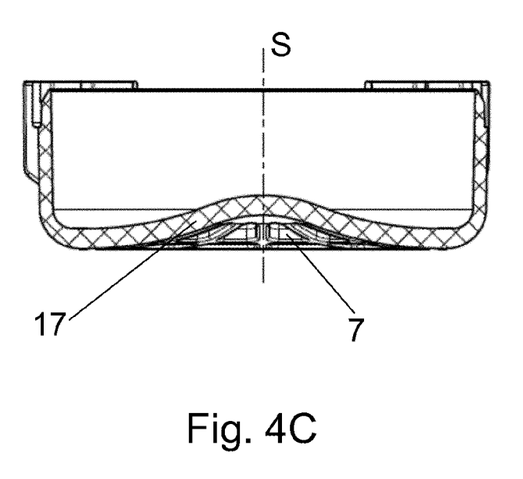

FIGS. 4A to 4C show views of an exemplary configuration of the base plate 14 with the exit openings 7 according to exemplary embodiments.

FIG. 4A firstly shows an exemplary embodiment in which the exit openings 7 form a honeycomb pattern in the base plate 14. The outlet openings 7 in the base plate 14, or the number thereof, are selected to be so large that the flow resistance is minimized. On the other hand, it is advantageous if the base plate 14 is stiff enough to prevent significant axial deformations as a result of a displacement of the noise-reducing material 2' under air pressure too. This may be realized for example by the stated honeycomb arrangement of the exit openings 7 in the base plate 14 on the lower surface of the noise damper. This honeycomb-like pattern may for example be distributed uniformly over the base plate 14, wherein the edges of the individual honeycombs may be of sufficiently thick or reinforced form in order to minimize a deformation during the pressure dissipation. It is likewise possible for corresponding outlet openings to be provided at a side surface of the housing 3, 4 (not shown in FIG. 4A).

FIG. 4B shows a further exemplary embodiment of the second housing part 4, on which fastening arrangement 20 (for the fastening of the first housing part 3) and three different types of reinforcement elements 13, 15, 16 are formed in order to suppress deformations of the second housing part 4. For example, along the outer periphery of the second housing part 4, there is formed a rib 13 which extends all the way around the second housing part 4 or is formed at least between the fastening elements 20. Furthermore, the exemplary embodiment shows concentric ribs 16 and radial ribs 15, which are formed at an outer side of the base plate 14. These radial and concentric ribs 15, 16 extend axially (in the compressed-air flow direction) and serve for preventing deformations of the base plate 14. Furthermore, the radial and concentric ribs 15, 16 are configured to be of different length in an axial direction, such that, for example, each opening 7 in the base plate 14 can allow the air to escape both downward and in a lateral direction. In particular, the concentric ribs 16 situated radially furthest to the outside has cutouts in order to thereby likewise provide openings to the side.

Said ribs 15, 16 are, in particular in a peripheral region, shaped such that the compressed air can pass out of the noise damper even if another object is present on a base region of the noise damper. In this case, the escaping air can escape in the lateral region between the ribs 15, 16. For example, on the base plate 14, the rib-like structures 15, 16 may be formed such that each outlet opening 7 can release the compressed air both in the axial direction and laterally therefrom. In this way, the likelihood of blockage at the exit is minimized, and reliable functioning of the noise damper is ensured.

The honeycomb-like structure from FIG. 4A may likewise be combined with these axially extending ribs 15, 16.

FIG. 4C shows a sectional illustration through the second housing part 4 according to a further exemplary embodiment, in which the base plate 14 has a concave form (as viewed from the outer side of the housing 3, 4). For example, the openings 7 may be formed at regular intervals along the base plate 14 of a concave configuration, which openings extend concentrically around the axial axis S. With the base plate 14 of the concave configuration, it is achieved that, as the first housing part 3 is joined together with the second housing part 14, a pressure build-up for the sound-damping material 2' within the chamber 2 is achieved, which sound-damping material can thus be held under preload such that air gaps between the sound-damping material 2' and a housing part can be prevented.

Figure 5:
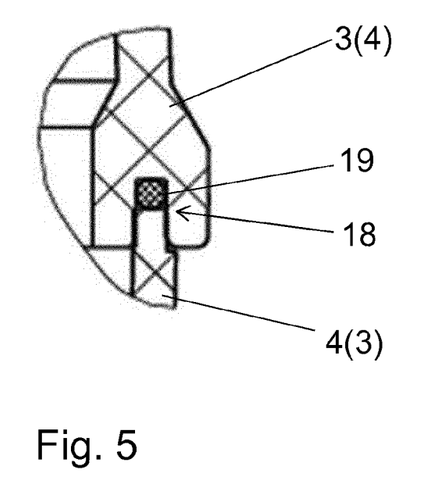
FIG. 5 shows an exemplary connection between the first housing part and the second housing part according to further exemplary embodiments.

FIG. 5 shows an exemplary connection between the first housing part 3 and the second housing part 4. It is thus possible, for example, for the first housing part 3 or the second housing part 4 to have a groove 18 into which a projection of the respective other housing part 4 or 3 can be introduced in order to produce a connection between the first housing part 3 and the second housing part 4. It is optionally likewise possible to secure the connection between the first and the second housing part 3, 4 by an additional detent connection or a bayonet fastener. In further exemplary embodiments, it is likewise possible for an adhesive connection, a seal or a sealing element 19 to be provided within the groove 18, which ensures a firm and sealed closure of the housing 3, 4.

For example, the groove-type connection 18 prevents a gap from being able to form between the housing parts 3, 4. For example, the groove 18 can be formed with a sufficient depth such that the other housing part or the corresponding projection is introduced axially into the groove over a relatively great distance. Here, any air gaps can be eliminated. Furthermore, the depth of the groove 18 may be configured such that the first and second housing parts 3, 4 can be pushed into one another such that an adequate preload within the sound-reducing material 2' is achieved.

In further embodiments, the groove 18 and a projection are formed along the housing parts 3, 4 such that they constitute a self-closing structure.

It is self-evident that not all of the described features need to be implemented together. In further exemplary embodiments, the individual features may be combined with one another in any desired manner in order to ensure the mechanical stability of the housing of the noise damper and in order to achieve improved noise damping.

Particularly advantageous aspects relate to the following exemplary embodiments:

A noise reduction unit for venting in compressed-air systems, in particular for utility vehicle brake systems, has, within the housing, a separating plate 8 which divides the housing interior into two portions, of which one portion has a connection channel 6 (for example to a venting valve) and the other portion constitutes a noise-damping chamber 2, which has sound-damping material 2'. Between the two chambers, the air flow is conducted via openings 9 which are provided in a (for example uniformly) distributed manner in a marginal region of the outer periphery of the separating plate 8. Furthermore, the two chambers 6, 2 are formed such that the air stream passes directly into the noise-reducing material 2' without passing through an intermediate gap. The undesired gap between the housing 3, 4 and the noise-reducing material 2' can be prevented by the following measures (specifically even when a compressed-air stream is being conducted through):

(a) the chamber is overfilled with noise-reducing material 2' (such that said noise-reducing material is under preload);
(b) the housing 3, 4 is stiffened by reinforcement elements 12, 13, 15, 16 in order to minimize housing deformations.

Furthermore, in further advantageous embodiments, the noise-reducing material 2' is elastically compressible such that it can be permanently kept under preload as the two housing parts 3, 4 are joined together. The sound-reducing material 2' is therefore in direct contact with the inlet openings 9, such that the compressed air is introduced into the sound-reducing material 2' directly after exiting the inlet openings 9.

In further advantageous exemplary embodiments, the stiffening elements 13 are formed as cylindrical ribs which extend on an outer side of the first housing part 3 and/or on an outer side of the second housing part 4. Furthermore, axially extending ribs 15, 16 may be provided on the base plate 14, which ribs have different axial lengths in order to thus permit an escape of the compressed air to one side (for example if the bottom side is covered by another body).

The features of the invention disclosed in the description, in the claims and in the figures may be essential to the realization of the invention both individually and in any combination.

THE LIST OF REFERENCE DESIGNATIONS IS AS FOLLOWS

2 Chamber
2' (Optionally provided) sound-damping material
3, 4 Housing (parts)
6 Inlet channel
7 Exit openings
8 Separating plate
9 (Inlet) openings
11 Shoulder region
14 Base plate
12,13,15,16 Reinforcement elements
18 Groove-type connection
19 Sealing element
S Axial axis

The invention claimed is:

1. A noise damper for a compressed-air system, for a brake system of a utility vehicle, comprising:
a housing having an inlet channel for a compressed-air stream and with a chamber for accommodating sound-damping material;
wherein the inlet channel and the chamber are separated, perpendicularly with respect to the compressed-air stream, by a separating plate which is closed in a central region and which, in an outer peripheral region of the compressed-air stream, has multiple openings for introducing the compressed air directly into the chamber, and
wherein the multiple openings in the separating plate have a cross section which widens along the compressed-air stream into the chamber, and wherein the housing has a shoulder region, such that the chamber has, along the compressed-air stream, a larger cross-sectional area than the inlet channel.

2. The noise damper of claim 1, wherein the housing has, at a level of the chamber, the shoulder region, such that the chamber has, along the compressed-air stream, the larger cross-sectional area than the inlet channel.

3. The noise damper of claim 1, further comprising:
sound-damping material which is in direct contact with the separating plate and which is present under preload in the chamber, such that the compressed-air stream, after passing through the openings, passes directly into the sound-damping material and, during operation, an air gap between sound-damping material and the separating plate is prevented.

4. The noise damper of claim 3, wherein the sound-damping material is arranged, so as to be elastically compressed by up to 10%, in the chamber.

5. The noise damper of claim 1, wherein the housing has, opposite the separating plate along the compressed-air stream, a base plate with a multiplicity of exit openings for the compressed-air stream, wherein the exit openings are formed as a honeycomb pattern in the base plate.

6. The noise damper of claim 5, wherein the base plate forms an indentation into the chamber.

7. The noise damper of claim 1, wherein the housing has a first housing part and a second housing part, wherein the first housing part and the second housing part includes a connection arrangement for fixedly connecting the first housing part and the second housing part to one another.

8. The noise damper of claim 7, wherein the connection arrangement includes at least one of the following: a bayonet fastener; a detent connection; a groove-type connection; and an adhesive connection.

9. The noise damper of claim 1, further comprising:
reinforcement elements, which are formed at at least one of the following positions on the housing: a connection region between the shoulder region and the inlet channel; annularly along an outer cylindrical periphery of the chamber, and/or at the exit openings;
wherein the reinforcement elements include radial ribs and concentric ribs, between which the exit openings are formed.

10. The noise damper of claim 7, wherein the connection arrangement provides a sealed connection between the first housing part and the second housing part to prevent an undesired escape of air between the first housing part and the second housing part.

11. The noise damper of claim 5, wherein exit openings and/or reinforcement elements are formed on the base plate such that the compressed-air stream exits partially laterally in a radial direction.

12. The noise damper of claim 5, wherein the housing is formed such that none of the exit openings are closer to the openings in the separating plate than the distance between the separating plate and the base plate.

13. A pneumatic brake system for a utility vehicle, comprising:
a venting device, which includes a noise damper, wherein the noise damper includes a housing having an inlet channel for a compressed-air stream and with a chamber for accommodating sound-damping material, wherein the inlet channel and the chamber are separated, perpendicularly with respect to the compressed-air stream, by a separating plate which is closed in a central region and which, in an outer peripheral region of the compressed-air stream, has multiple openings for introducing the compressed air directly into the chamber;
wherein the compressed-air inlet of which is connected to the venting device, and
wherein the multiple openings in the separating plate have a cross section which widens along the compressed-air stream into the chamber, and wherein the housing has a shoulder region, such that the chamber has, along the compressed-air stream, a larger cross-sectional area than the inlet channel.

14. A method for producing a noise damper for a compressed-air system, for a brake system of a utility vehicle, the method comprising:
forming a housing;
forming an inlet channel for a compressed-air stream;
forming a chamber for accommodating sound-damping material;
forming a separating plate which separates the inlet channel and the chamber perpendicularly with respect to the compressed-air stream; and
forming multiple openings in an outer peripheral region of the compressed-air stream to introduce the compressed air into the chamber, and
wherein the multiple openings in the separating plate have a cross section which widens along the compressed-air stream into the chamber, and wherein the housing has a shoulder region, such that the chamber has, along the compressed-air stream, a larger cross-sectional area than the inlet channel.

15. The method of claim 14, wherein the chamber is fully filled, or overfilled, with the sound-damping material.

* * * * *